United States Patent [19]

Chang et al.

[11] Patent Number: 5,001,094

[45] Date of Patent: Mar. 19, 1991

[54] HYDROCARBON CONVERSION PROCESS INCLUDING ACIDIC ZEOLITE REACTIVATION

[75] Inventors: Clarence D. Chang, Princeton; Cynthia T. W. Chu, Princeton Jct., both of N.J.

[73] Assignee: Mobil Oil Corporation, Fairfax, Va.

[21] Appl. No.: 282,534

[22] Filed: Dec. 12, 1988

Related U.S. Application Data

[63] Continuation-in-part of Ser. No. 64,738, Jun. 22, 1987, abandoned.

[51] Int. Cl.$^5$ .................. B01J 29/38; B01J 38/66; C10G 47/16; C07C 1/00
[52] U.S. Cl. ..................... 502/26; 208/111; 208/120; 502/25; 585/408; 585/640
[58] Field of Search ............ 502/25, 26, 521; 208/52 CT, 120

[56] References Cited

U.S. PATENT DOCUMENTS

| | | | |
|---|---|---|---|
| 3,197,399 | 7/1965 | Wight | 208/111 |
| 3,374,182 | 3/1968 | Young et al. | 252/455 |
| 3,407,148 | 6/1986 | Eastwood | 208/120 |
| 3,699,037 | 10/1972 | Annessler et al. | 208/120 |
| 4,244,810 | 1/1981 | Youngblood et al. | 208/120 |
| 4,364,847 | 12/1982 | Tu | 208/120 |
| 4,377,494 | 3/1983 | Bertus et al. | 208/120 |
| 4,414,098 | 11/1983 | Zandona et al. | 208/120 |
| 4,443,554 | 4/1984 | Dessau | 502/71 |
| 4,468,475 | 8/1984 | Kuehl | 502/71 |
| 4,477,582 | 10/1984 | Miale | 502/26 |
| 4,478,950 | 10/1984 | Chu | 502/85 |
| 4,559,314 | 12/1985 | Shihabi | 502/71 |
| 4,559,315 | 12/1985 | Chang et al. | 502/71 |
| 4,563,435 | 1/1986 | Chu et al. | 502/71 |
| 4,594,333 | 6/1986 | Chang et al. | 502/71 |
| 4,596,704 | 6/1986 | Miale et al. | 423/328 |
| 4,724,270 | 2/1988 | Chang | 585/408 |

*Primary Examiner*—Paul E. Konopka
*Attorney, Agent, or Firm*—Alexander J. McKillop; Charles J. Speciale; Malcolm D. Keen

[57] ABSTRACT

A spent acidic zeolite catalyst, e.g., ZSM-5 obtained from a hydrocarbon conversion process such as a catalytic dewaxing operation, is reactivated by contacting the spent catalyst with aqueous alkali metal carbonate and/or alkaline earth metal carbonate.

16 Claims, No Drawings

HYDROCARBON CONVERSION PROCESS INCLUDING ACIDIC ZEOLITE REACTIVATION

CROSS-REFERENCE TO RELATED APPLICATION

This application is a continuation-in-part of our prior application Ser. No. 07/064,738, filed 22 June 1987, now abandoned, the disclosure of which is incorporated in this application by reference.

FIELD OF THE INVENTION

This invention relates to hydrocarbon conversion processes such as dewaxing and more particularly to such processes employing zeolitic conversion catalysts.

BACKGROUND OF THE INVENTION

Heterogeneous acidic oxides are used extensively in the petroleum and petrochemicals industry to catalyze a variety of hydrocarbon conversions. These conversions include catalytic cracking, hydrocracking, naphtha reforming, benzene alklation, xylene isomerization, catalytic dewaxing, and other conversions.

During use, as is generally known, the catalysts undergo loss of catalytic activity, selectivity, or both. The time required for the activity to decay to the point at which the catalyst is no longer useful may vary from as little as a few minutes, as in catalytic cracking, to several years, as with some versions of naphtha reforming. Some of the factors which affect the aging rate include the nature of the feed, the nature of the catalyst, and process conditions. In general, catalyst deactivation is accompanied by an accumulation of "coke" or organic matter on the catalyst and it was early learned to regenerate deactivated catalysts by burning the organic matter in an oxygen-containing gas.

Catalytic dewaxin is described, for example, in U.S. Pat. Nos. Re. 29,398, 3,852,189 and 3,956,102, the disclosures of which are incorporated by reference herein. U.S. Pat. No. 3,956,102 discloses the regeneration of a dewaxing catalyst by burning the deactivated catalyst in oxygen and reactivating the catalyst by contact with hydrogen for about 24 hours at 400 psig. U.S. Pat. No. 4,358,395, the disclosure of which is also incorporated by reference herein, discloses that a ZSM-5 type catalyst which has undergone controlled precoking and has become deactivated in a methanol conversion process is reactivated at 800° F. to about 1200° F. in an atmosphere containing hydrogen.

Although burning in an oxygen-containing gas and treatment with hydrogen are known to regenerate catalysts, these processes in general require high temperature and are costly. In the case of regeneration with hydrogen, special metallurgy is required. Furthermore, these regenerations often fail to fully restore all of the properties of the virgin catalyst.

In accordance with U.S. Pat. No. 4,550,090, deactivated ZSM-5 obtained from a catalytic dewaxing operation is regenerated by contacting the accumulated organic matter with a source of alkali or alkaline earth metal cations, ammonia or mixtures thereof followed by extraction with an organic solvent. Sources of these cations which are mentioned in the patent are the hydroxides or salts with chlorides, acetates and nitrates being particularly preferred. Carbonates are not mentioned.

U.S. Pat. Nos. 4,559,315 and 4,594,333 disclose increasing the ion-exchange capacity and acid catalytic activity of a ZSM-5 type zeolite by treatment with an aqueous solution of a source of alkali metal cation, particularly preferred sources of such cation being sodium or potassium hydroxide or the sodium or potassium salts of acetic, carbonic or phosphoric acid. Reactivation or a coked, spent zeolite is nowhere disclosed or suggested.

U.S. Pat. No. 4,477,582 (Miale) discloses a process for reactivating a steam-deactivated zeolite catalyst using an aqueous ammonium ion-containing solution. Miale distinguishes his steam-deactivated catalysts from coke-deactivated catalysts and indicates that coke-deactivated catalysts can be readily regenerated by air oxidation. Removal of the coke by oxidation conventionally creates no problems, as recognized by Miale, but during oxidative removal of the coke catalyst activity is frequently lost. It would, of course, be desirable to restore activity to the original level, if possible, but Miale does not indicate that his method is of any utility with coke-deactivated zeolites.

It is an object of this invention to provide a process for carrying out a hydrocarbon conversion process using a reactivated zeolite catalyst which has previously become irreversibly deactivated by the deposition of coke during the conversion process.

It is still a further object of this invention to provide a process for reactivating an intermediate pore size zeolite catalyst, e.g., ZSM-5, which has become irreversibly deactivated in the course of use as a dewaxing catalyst.

SUMMARY OF THE INVENTION

The hydrocarbon conversion process according to the present invention employs an acidic zeolite which has been reactivated by:
  (a) regenerating the catalyst by removing at least a major part of accumulated "coke" or carbonaceous matter from the catalyst,
  (b) contacting the regenerated zeolite with a reactivation effective amount of an aqueous solution of alkali metal carbonate and/or alkaline earth metal carbonate under conditions sufficient to restore at least a significant amount of said acid catalyst activity of the fresh zeolite; and,
  (c) reconverting the catalyst to the catalytically active, acidic form thereof.

DESCRIPTION OF THE PREFERRED EMBODIMENTS

Any acidic zeolite catalyst which has become substantially spent, or deactivated, during use by the deposition of "coke" or hydrocarbonaceous material can be suitably reactivated in accordance with the present process. In general, a zeolite can be considered "spent" when, as a result of use, it has lost greater than about 50% of the acid catalytic activity of the fresh catalyst. Such loss of activity is usually due to the accumulation of carbonaceous residues on catalytically active surfaces of the zeolite.

The term "acidic" as used herein refers to any zeolite catalyst which is capable of inducing what is recognized in the art as an acid catalyzed reaction. Examples of acid catalyzed reactions include conversion of methanol to gasoline boiling range hydrocarbons, toluene disproportionation, xylene isomerization, benzene alkylation, cumene dealkylation, double bond shift, etc. As is known in the art, the acid catalytic activity of a zeolite may be measured by its "alpha value", which is the ratio of the rate constant of a test sample for cracking normal hexane to the rate constant of a standard reference catalyst. Thus, an alpha value of 1 indicates that the test sample and the reference standard have about the same activity. The alpha test is described in U.S. Pat. No. 3,354,078 and in the *Journal of Catalysis*, vol. IV, pp. 522–529 (Aug. 1865), both of which are incorporated herein by reference. Measurement of the alpha value is useful to quantify catalyst activity before treatment as well as the degree of activation achieved by the reactivation process of this invention. For this purpose, the zeolite is converted to the hydrogen form before evaluation. However, other types of conversion can also be used in the evaluation of catalytic activity and the zeolite need not always be in the hydrogen form.

This invention is particularly useful with catalysts based on zeolites of intermediate pore size. Although these zeolites have unusually low alumina contents, i.e., high silica to alumina ratios, they are very active even when the silica to alumina ratio exceeds 30. The activity is surprising since catalytic activity if generally attributed to framework aluminum atoms and/or cations associated with these aluminum atoms. These zeolites retain their crystallinity for long periods in spite of the presence of steam at high temperature which induces irreversible collapse of the framework of other zeolites, e.g., of the X and A type. Furthermore, carbonaceous deposits, when formed, can be removed by burning at higher than usual temperatures to restore activity. These zeolites, used as catalysts, generally have low coke-forming activity and therefor are conductive to long times on stream between regenerations.

An important characteristic of the crystal structure of this class of zeolites is that is provides constrained access to, and egress from, the intracrystalline free space by virtue of having an effective pore size intermediate between the small pore Linde A and the large pore Linde X, i.e., the pore windows of the structure have about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred type zeolites useful in this invention possess, in combination, a silica to alumina mole ratio of at least about 12 and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic or other form which may be present within the channels. Although zeolites with a silica to alumina ratio of at least about 12 are useful, it is preferred to use zeolites having ratios of at least about 30. Such zeolites, after activation, acquire an intracrystalline sorption capacity for normal hexane which is greater than that for water, i.e., they exhibit "hydrophobic" properties. It is believed that this hydrophobic character is advantageous in the present invention.

The preferred zeolites useful in this invention have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of oxygen atoms, then access to molecules of larger cross-section than normal hexane is excluded and the zeolite is not of the desired type. Windows of 10-membered rings are preferred, although in some instances excessive puckering of the rings or pore blockage may render these zeolites ineffective. 12-Membered rings usually do not offer sufficient constraint to produce the advantageous conversions, although the puckered 12-ring structure of TMA offretite shows constrained access. Other 12-ring structures may exist which, due to pore blockage or to other cause, may be operative.

Rather than attempt to judge from crystalline structure whether or not a zeolite possesses the necessary constrained access to molecules larger than normal paraffins, a simple determination of the Constraint Index (C.I.) as herein defined may be made by passing continuously a mixture of an equal weight of normal hexane and 3-methylpentane over a small sample, approximately one gram or less, of zeolite at atmospheric pressure according to the following procedure. A sample of the zeolite, in the form of pellets or extrudate, is crushed to a particle size about that of course sand and mounted in a glass tube. Prior to testing, the zeolite is treated with a steam of air at 1000° F. for at least 15 minutes. The zeolite is then flushed with helium and the temperature is adjusted between 550° F. to give an overall conversion between 10% and 60%. The mixture of hydrocarbons is passed at liquid hourly space velocity (i.e., 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determined the fraction remaining unchanged for each of the two hydrocarbons.

The Constraint Index is calculated as follows:

$$C.I. = \frac{\log 10 \text{ (fraction of n-hexane remaining)}}{\log 10 \text{ (fraction of 3-methylpentane remaining)}}$$

The Constraint Index approximates the ratio of the cracking rate constants for the two hydrocarbons. Spent zeolites suitable for reactivation in accordance with the present invention are those having a Constraint Index of 1 to 12. Constraint Index values for some typical zeolites are:

| Zeolite | Constraint Index |
|---|---|
| ZSM-4 | 0.5 |
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| TMA Offretite | 3.7 |
| Beta | 0.6 |
| H-Zeolon (mordenite) | 0.4 |
| REY | 0.4 |
| Amorphous Silica-Alumina | 0.6 |
| Erionite | 38 |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby have different Constraint Indexes. Constraint Index seems to vary somewhat with the severity of operation (conversion) and the presence of absence of binder. Therefor, it will be appreciated that it may be possible to so select test conditions to establish more than one value in the range of 1 to 12 for the Constraint Index of a particular zeolite. Such a zeolite exhibits the constrained access as herein defined and is to be regarded as having a Constraint Index of 1 to 12. Also contemplated herein as having a Constraint Index of 1 to 12 are those zeolites which, when tested under two or more sets of conditions within the above-specified ranges of temperature and conversion, produce a value of the Constraint Index slightly less than 1, e.g., 0.9, or somewhat greater than 12, e.g. 14 or 15, with at least one other value of 1 to 12. Thus, it should be understood that the Constraint Index value as used herein is an inclusive rather than an exclusive value. That is, a zeolite when tested by any combination of conditions with the testing definition set forth hereinabove and found to have a Constraint Index of 1 to 12 is intended to be included in the instant catalyst definition regardless that the same identical zeolite tested under other defined conditions may give a Constraint Index value outside of 1 to 12.

As previously indicated, the reactivating procedure of this invention applies to all acidic zeolites including the large pore size materials such as zeolites X, Y and Beta but is particularly applicable to the intermediate pore size zeolites and exemplified by ZSM-5, ZSM-11, ZSM-12, ZSM-21, ZSM-23, ZSM-35, ZSM-28, ZSM-48, and other similar materials.

ZSM-5 is more particularly described in U.S. Pat. No. 3,702,886, the entire content of which is incorporated herein by reference.

ZSM-11 is more particularly described in U.S. Pat. No. 3,709,979, the entire content of which is incorporated herein by reference.

ZSM-12 is more particularly described in U.S. Pat. No. 3,832,449, the entire content of which is incorporated herein by reference.

ZSM-21 is more particularly described in U.S. Pat. No. 4,046,859, the entire content of which is incorporated herein by reference.

ZSM-23 is more particularly described in U.S. Pat. No. 4,076,842, the entire content of which is incorporated herein by reference.

ZSM-35 is more particularly described in U.S. Pat. No. 4,016,245, the entire content of which is incorporated herein by reference.

ZSM-38 is more particularly described in U.S. Pat. No. 4,046,859, the entire content of which is incorporated herein by reference.

The specific zeolites described, when prepared in the presence of organic cations, are substantially catalytically inactive, possible because the intracrystalline free space is occupied by organic cations from the forming solution. They may be activated by heating in an inert atmosphere at 1000° F. for one hour, for example, followed by calcination at 1000° F. in air. The presence of organic cations in the forming solution may not be absolutely essential to the formation of this type zeolite; however, the presence of these cations does appear to favor the formation of this special class. More generally, it is desirable to activate this type catalyst by base exchange with ammonium salts followed by calcination in air at about 1000° F. for from about 15 minutes to about 24 hours.

Natural zeolites may sometimes be converted to this type zeolite catalyst by various activation procedures and other treatments such as various combinations of base exchange, steaming, alumina extraction and calcination. Natural minerals which may be so treated include ferrierite, brewsterite, stilbite, dachiardite, epistilbite, heulandite, and clinoptilolite. The preferred crystalline zeolites are ZSM-5, ZSM-11, ZSM-12, ZSM-21, ZSM-23, ZSM-35, ZSM-38, and ZSM-48 with ZSM-5 and ZSM-11 being particularly preferred. In some instances, it is advantageous to steam the fresh zeolite to reduce its activity and thereby improve its selectively prior to use. Such improvement has been noted with steamed ZSM-5.

In a preferred aspect of this invention, the zeolites selected are those having a crystal framework density, in the dry hydrogen form, of not less than about 1.6 grams per cubic centimeter. It has been found that zeolites which satisfy all three of these criteria are most desired. Therefore, the preferred zeolites of this invention are those having a Constraint Index as defined above of about 1 to 12 and a dried crystal density of not less than about 1.6 grams per cubic centimeter. The dry density for known structures may be calculated from the number of silicon plus aluminum atoms per 1000 cubic Angstroms, as given, e.g., on page 19 of the article on Zeolite Structure by W. M. Meier. This paper, the entire content of which is incorporated herein by reference, is included in "Proceedings of the Conference on Molecular Sieves, London, Apr. 1967," published by the Society of Chemical Industry, London, 1968. When the crystal structure is unknown, the crystal framework density may be determined by classical pyknometer techniques. For example, it may be determined by immersing the dry hydrogen form of the zeolite in an organic solvent not sorbed by the crystal. Or, the crystal density may be determined by mercury porosimetry, since mercury will fill the interstices between individual crystals but will not penetrate the intracrystalline free space. It is possible that the unusual sustained activity and stability of this class of zeolites is associated with its high crystal anionic framework density of not less than about 1.6 grams per cubic centimeter. This high density must necessarily be associated with a relatively small amount of free space within the crystal, which might be expected to result in more stable structures. This free space, however, is important as the locus of catalytic activity.

Crystal framework densities of some typical zeolites including some which are not within the purview of this invention are:

| Zeolite | Void Volume | Framework Density |
|---|---|---|
| Ferrierite | 0.28 cc/cc | 1.76 g/cc |
| Mordenite | .28 | 1.7 |
| ZSM-5, 11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM Omega | .38 | 1.65 |
| Heulandite | .39 | 1.69 |
| P | .41 | 1.57 |

-continued

| Zeolite | Void Volume | Framework Density |
|---|---|---|
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5 percent by weight may be used. Thus, the original alkali metal of the zeolite may be replaced by ion exchange with other suitable metal cations of Groups I through VIII of the Periodic Table, including, by way of example, nickel, copper, zinc, panadium, calcium or rare earth metals.

The spent zeolites herein are often associated with a matrix material which is resistant to the temperature and other conditions employed in the processes which they catalyze. Such matrix materials include synthetic or naturally occurring substances as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the spent zeolites may be composited with a porous matrix material, such as alumina, silica-magnesia, silica-zirconia, silica-thoria, silica-berylia, silica-titania as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix or an anhydrous basis may vary widely with the zeolite content ranging from between about 5 to about 99 percent by weight and more usually in the range of about 10 to about 80 percent by weight of the dry composite.

The reactivation process of this invention is advantageously practiced with a ZSM-5 type zeolite having a silica to alumina ratio greater than about 12, and in particular with a silica to alumina ratio greater than about 60:1, preferably greater than 500:1 and still more preferably greater than 1600:1. The sources of the spent zeolites are quite varied. In the case of intermediate pore size zeolites such as ZSM-5, the spent catalysts resulting from dewaxing operations are readily reactivated in accordance with the process of this invention.

Prior to contacting the spent zeolite with alkali metal carbonate and/or alkaline earth metal carbonate, the zeolite will be subjected to a burning operation to remove at least a major part of any accumulated carbonaceous matter or "coke". The requirements of the burning operation are well known in the art. In general, burning is carried out in the presence of an oxygen-containing gas, typically supplied as air, at temperatures of from about 500° to 1000° F. or even higher and at oxygen concentrations of from about 0.90 to 10 mole percent. The duration of the burning operation is not narrowly critical and will obviously vary depending on the temperature, oxygen concentration as well as the amount of carbonaceous matter on the catalyst. A preferred burning operation would include treating a spent catalyst with about 0.2 to 7 mole percent of oxygen at temperatures of about 700° to 850° F. at pressures of 1 to 70 atmospheres.

The activation method of this invention is fairly simple. Thus, for example, a physical mixture of ZSM-5 type zeolite and a matrix material such as alumina is treated with liquid water at a temperature below its critical temperature, i.e., below about 370° C. in the presence of a reactivating amount of alkali metal carbonate and/or alkaline earth metal carbonate for a time effective to induce significant increased acid catalytic activity.

Contemplated as useful alkali and/or alkaline earth metal carbonates are those of lithium, sodium, potassium, rubidium, caesium, calcium, magnesium, strontium and barium. Preferred alkali metal and/or alkaline earth metal carbonates are those of lithium, sodium, potassium, calcium and magnesium. The amount of alkali and/or alkaline earth metal carbonate to be used can vary widely but in all instances must be at least a reactivating amount, i.e., an amount effective to restore by a substantial amount, such as at least about 20%, the acid catalytic activity of the fresh zeolite.

The amount of liquid water required is at least that amount sufficient to fill the pores of the physical mixture to be treated. However, for maximum effectiveness, and for best control of the reactivation process and reproducibility of results, it is preferred to use sufficient excess liquid water so that some or all of the physical mixture will be submerged in liquid water, i.e., it is preferred to conduct the activation in a continuous phase of liquid water. Although the method of this invention can be practiced over the whole range of temperature at which water remains liquid, i.e., from about 1° to about 370° C., reactivation is sofacile that the normal boiling point of water need not be exceeded. Very substantial activation may be observed at room temperature. A particularly preferred embodiment is to conduct the activation under reflux at about the normal boiling point of water under which conditions the activity of a spent ZSM-5 sample can be increased within as little as two hours about twenty thousand fold from hexane cracking activity in the spent condition of about 0.02 to 450. The duration and temperature of the reactivation treatment can vary widely. For a given spent zeolite, the optimum reactivating condition can be readily determined employing routine testing. Broadly, these will be within a temperature of from 1° to 370° C. for a period of less than about 1 hour up to about 100 hours. A preferred temperature range is from about 10° to about 200° C. with from about 20° to about 212° C. particularly preferred. For any of these temperature ranges, the preferred treatment time is from about less than 1 hour to about 24 hours.

Following treatment with the alkali metal carbonate and/or alkaline earth metal carbonate, it is necessary to reconvert the catalyst to the hydrogen form, e.g., employing the aforestated procedures of converting the zeolite to an intermediate ammonium form as a result of ammonium ion exchange followed by calcination to provide the hydrogen form. The operational requirements of these procedures are well known in the art and require no elaboration here.

A variety of hydrocarbon conversion processes are contemplated by the present invention including shape-selective cracking processes such as dewaxing, hydrocracking, and other processes in which a hydrocarbon feed is reduced in molecular weight by contact with the zeolite catalyst during the course of the reaction. Other reactions including reforming, isomerization, alkylation, or dealkylation in which a zeolite catalyst is subjected to coke deactivation while in use, may produce deactivated zeolite catalysts which may be successfully regenerated and reactivated by the present procedure. Catalysts from other processes in which hydrocarbons are produced from other materials e.g. oxygenates such as methanol or ethanol, or in which a hydrocarbon is a reactant and which produce a coke-deactivated zeolite catalyst, are also amenable to treatment by the present reactivation process.

The following examples are illustrative of the invention:

EXAMPLE 1

A spent dewaxing catalyst consisting of 65 weight percent ZSM-5 composited with 35 weight percent alumina and having an alpha value of 50 was burned in air to remove carbonaceous residue and then contacted with 0.5M aqueous sodium carbonate at 100° C. for 2 hours. The treated zeolite was washed, refluxed with 1N NH4NO3 solution for 2 hours, room temperature exchanged with 1N NH4NO3 overnight and then calcined at 538° C. for 4 hours. The alpha value of the reactivated zeolite catalyst was 104.

EXAMPLE 2

Example 1 was substantially repeated but treatment with aqueous sodium carbonate was carried out for 4 hours instead of 2. The alpha value of the reactivated zeolite catalyst was 110.

EXAMPLE 3

A deactivated methanol-to-gasoline conversion catalyst consisting of 65 weight percent ZSM-5 composited with 35 weight percent alumina and having an alpha value of 13 was burned in air to remove carbonaceous residue then contacted with 0.5M aqueous sodium carbonate at 100° C. for 1 hour. The treated zeolite was washed, refluxed in 1N NH4NO3 solution overnight then calcined at 538° C. for 4 hours. The alpha value of the reactivated zeolite catalyst was 148.

EXAMPLE 4

The difference between steam-deactivation and coke-deactivation of zeolite catalysts was demonstrated by steaming a sample of a ZSM-5 extrudate (65% ZSM-4, 35% alumina) for 24 hours at 482° C. The alpha value of the steamed catalyst was 32.

One sample of the steamed catalyst was treated with 0.5M Na2CO3 solution at 100° C. for 0.5 hour. The treated material was washed, NH4 exchanged and calcined. The alpha value of the reactivated catalyst was 146.

EXAMPLE 5

A second sample of the steamed extrudate of Example 4 was treated with 0.5M Na2CO3 solution at 100° C. for 2 hours. The treated material was washed, NH4 exchanged and calcined. The alpha value of the reactivated catalyst was 342.

The alpha values of the coke-deactivated and steam-deactivated catalysts before and after reactivation are shown in the Table below.

TABLE

| Na2CO3 Reactivation | Alpha |
|---|---|
| Spent dewaxing catalyst | |
| Before reactivation | 50 |
| 2 hours treatment (Ex. 1) | 104 |
| 4 hours treatment (Ex. 2) | 110 |
| Steam-deactivation Catalyst | |
| Before treatment | 32 |
| 0.5 hour treatment (Ex. 4) | 146 |
| 2 hours treatment (Ex. 5) | 342 |

Results clearly show that there is significant difference between a steam-deactivated catalyst and spent coke deactivated catalyst. The coke deactivated catalyst needs more severe conditions to obtain a comparable level of activation.

We claim:

1. In a hydrocarbon conversion process in which a hydrocarbon is subjected to contact with an acidic intermediate or large pore size zeolite catalyst to produce conversion products and in which the catalyst undergoes a significant loss in acid catalytic activity as a result of accumulating carbonaceous matter during the conversion, the improvement comprising:
    subjecting the zeolite catalyst with the accumulated carbonaceous material to a burning operation in the presence of an oxygen-containing gas to remove at least a major part of the accumulated carbonaceous material, contacting the catalyst with an effective amount of an aqueous liquid solution of an alkali metal carbonate and/or aqueous alkaline earth metal carbonate at a temperature from 100° to 370° C. for a period of from 1 to 24 hours,
    subjecting the catalyst to ammonium ion exchange followed by calcination to convert the zeolite to the hydrogen form, under conditions sufficient to restore at least a significant amount of the acid catalytic activity of the fresh zeolite prior to reusing the catalyst in the conversion process.

2. The process of claim 1 wherein the zeolite is an intermediate pore size zeolite.

3. The process of claim 2 wherein the zeolite is ZSM-5.

4. The process of claim 1 wherein the zeolite is a large pore size zeolite.

5. The process of claim 1 wherein the zeolite is X, Y or Beta.

6. The process of claim 1 wherein the zeolite is present in admixture with a matrix material.

7. The process of claim 1 wherein the zeolite is present in admixture with alumina or an alumina-containing matrix material.

8. The process of claim 1 wherein the carbonate is one of lithium, sodium, potassium, calcium or magnesium.

9. The process of claim 1 wherein contacting of the spent zeolite with aqueous carbonate is carried out with from about 0.001 to about 1 molar aqueous carbonate.

10. The process of claim 1 wherein the zeolite possesses a Constraint Index of from about 1 to about 12.

11. The process of claim 1 wherein the zeolite possesses a Constraint Index of less than about 1.

12. The process of claim 2 wherein the carbonate is one of lithium, sodium, potassium, calcium or magnesium.

13. The process of claim 3 wherein the carbonate is one of lithium, sodium, potassium, calcium or magnesium.

14. The process of claim 4 wherein the carbonate is one of lithium, sodium, potassium, calcium or magnesium.

15. The process of claim 7 wherein the carbonate is one of lithium, sodium, potassium, calcium or magnesium.

16. The process of claim 9 wherein the carbonate is one of lithium, sodium, potassium, calcium or magnesium.

* * * * *